United States Patent [19]

Diehl et al.

[11] Patent Number: 5,128,523

[45] Date of Patent: Jul. 7, 1992

[54] MICROCONTROLLED READER FOR SMART CARDS

[75] Inventors: Eric Diehl, Neudorf; Joël Hamon, Lipsheim, both of France

[73] Assignee: Laboratoire Europeen de Recherches Electroniques Avancees Societe en Nom Collectif, Courbevoie, France

[21] Appl. No.: 606,847

[22] Filed: Oct. 31, 1990

[30] Foreign Application Priority Data

Nov. 7, 1989 [FR] France ................. 89 14568

[51] Int. Cl.⁵ ........................................ G06K 7/06
[52] U.S. Cl. ........................... 235/441; 235/492
[58] Field of Search .......................... 235/441, 492

[56] References Cited

U.S. PATENT DOCUMENTS

| | | | |
|---|---|---|---|
| 4,682,224 | 7/1987 | Ragan et al. | 235/492 X |
| 4,772,783 | 4/1988 | Ono et al. | 235/492 |
| 4,785,166 | 11/1988 | Kushima | 235/441 |
| 4,808,802 | 2/1989 | Kano . | |
| 4,920,256 | 4/1990 | Marty et al. | 235/492 X |
| 4,990,760 | 2/1991 | Tomari et al. | 235/492 |

FOREIGN PATENT DOCUMENTS 0202622 11/1986 European Pat. Off. .
0243312 10/1987 European Pat. Off. .

OTHER PUBLICATIONS

Patent Abstracts of Japan, vol. 10, No. 223 (P-483)(2279), Aug. 5, 1986, M. Nishikata, & JP-A-6-1-59586, Mar. 27, 1986, "IC Card Reading Writing Device".

*Primary Examiner*—David Trafton
*Attorney, Agent, or Firm*—Oblon, Spivak, McClelland, Maier & Neustadt

[57] ABSTRACT

Reader for smart cards comprising a supply for the circuits of the card, a means of controlling information exchanges between the card and the reader and an input for digital signals from a pay-television system. The means of control comprises a first microcontroller which receives the digital signals and which controls a second microcontroller which itself controls the exchange of information with the card and delivers power supply control signals as a function of the information received from the card. The outputs from the first microcontroller are at a fixed potential during the resets and the outputs from the second microcontroller are at a floating potential during the resets. A port enables the first microcontroller to control the power supply during the resets.

6 Claims, 1 Drawing Sheet

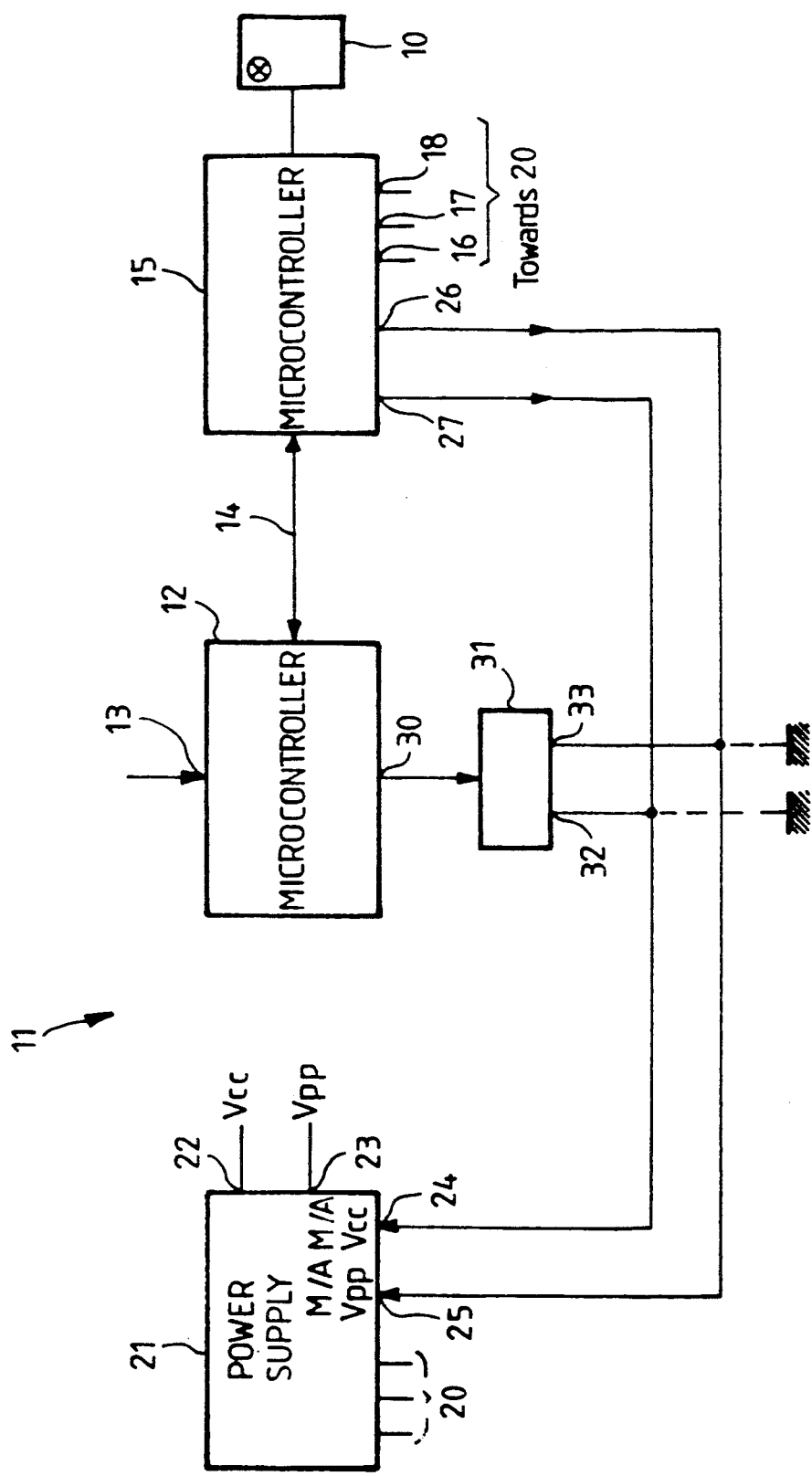

MICROCONTROLLED READER FOR SMART CARDS

BACKGROUND OF THE INVENTION

The invention concerns a reader for smart cards with contacts, notably for the reception of pay-television broadcasts.

Smart cards with contacts have more and more applications. These cards have the rectangular format of credit cards with, at the surface, an integrated circuit containing usually confidential information. For example when these cards are used to authorize the reception of pay-television broadcasts, the integrated circuit contains an authorization datum which enables a reception device to unscramble the coded video signals received.

The readers of such cards have a circuit to manage the information exchange protocol between the reader and the card which determines, as a function of data communicated by the card's circuit, the parameters of the card such as: the programming voltage which may be necessary, i.e. the voltage to write permanent information in a memory of the integrated circuit, the clock frequency, the power supply, the speed of information exchange between the card and the reader and its synchronous or a synchronous mode of operation.

SUMMARY OF THE INVENTION

The invention enables such a reader of smart cards to be made, notably for a receiver device for scrambled television broadcasts, which is simple and economic to make and does not compromise the correct operation of this reader.

It is characterized by the fact that the reader comprises a first microcontroller for reception of information, notably television signals, a second microcontroller to manage the information exchange protocol with the smart card and which is controlled by the first microcontroller. This second microcontroller controls a generator for power supply to the card which provides the voltages necessary for reading and if necessary programming of the card.

The separation of the functions into a first microcontroller for information reception and a second microcontroller, controlled by the first, for the management of the information exchange protocol with the cart, enables the cost of the reader to be optimized.

Certain inexpensive microcontroller deliver output signals at a floating potential, i.e. at a randomly-varying value, when they are rest. For example, the INTEL 8052A microcontroller is of this type.

In the preferred mode of embodiment of the invention a circuit of this type, i.e. whose outputs are floating when reset, is chosen for the second microcontroller for the management of the information exchange protocol between the card and the reader. However as this second microcontroller controls the power supply to the card, particular measures must be taken so that these floating voltages do not provoke voltages which could damage the card. For this reason the first microcontroller has fixed-potential outputs during resets and controls the power supply during these periods. Preferentially, the first microcontroller inhibits the supply during the rests. As a variant, the first imcrocontroler imposes minimal values for the generator voltages during the resets.

The microcontrollers are reset in particular when the reader is switched on.

BRIEF DESCRIPTION OF THE DRAWING

Other characteristics and advantages of the invention will appear with the description of some of its modes of embodiment, this description being made with reference to the single figure which is a diagram of a smart card reader for the reception of scrambled television broadcasts.

DESCRIPTION OF THE PREFERRED EMBODIMENT

To unscramble television broadcasts received in a coded state, a receiver is usually provided with an unscrambling circuit (not shown) which can function only if it has received the authorization from a smart card 10 which conforms to the norm ISO 7618.

This receiver 11 includes a first microcontroller or microprocessor 12 of the MOTOROLA 6805 type intended to receive at an input 13 digital information from the television signal. This digital information is contained for example in a signal of MAC-PAQUET or "Videocrypt" type. A videocrypt system is described for example in the French patent 88 06121 and in the French patent 88 17092, both in the name of the Applicant.

This information, stored and if necessary processed by the microcontroller 12, are passed via a bus 14 to a second microcontroller 15 which constitutes the management circuit of the information exchange protocol between the card 10 and the reader 11.

The output potential from the microcontroller 12 remains at a fixed value during the reset. On the other hand the microcontroller 15 which is, in the example, of INTEL 8052 type, has floating output potentials during the reset procedure controlled by the microcontroller 12.

Signals appear at outputs 16, 17 and 18 of the microcontroller 15 which are transmitted to corresponding inputs 20 of a generator 21 of direct voltages $V_{cc}$ and $V_{pp}$. The generator 21 thus has an output 22 which delivers the voltage $V_{cc}$ supply to the circuits of the card 10 and an output 23 which delivers the voltage $V_{pp}$ necessary to program the card 10, i.e. to write permanent information on this card.

The values of the voltages $V_{cc}$ and $V_{pp}$ depend on the signals applied at the inputs 20, i.e. supplied by the outputs 16, 17, 18 of the microcontroller 15.

Moreover a voltage $V_{cc}$ appears at the output 22 only if an authorization voltage is supplied at a corresponding input 24 of the generator 21. The signal at the input 24 thus constitutes the "on-off" command of the voltage $V_{cc}$ In the same way an input 25 of the generator 21 is intended to receive an authorization, or on-off signal, for the voltage $V_{pp}$ at the output 23. The signals at the inputs 24 and 25 of the generator 21 are supplied, in normal operation, by outputs 26 and 27 of the microcontroller 15.

Given that, during a reset procedure, notably when the reader 11 is switched on, the outputs 16, 17, 18, 26, 27 of the microcontroller 15 have floating potentials, i.e. potentials which vary in a quasi-random manner, signals could appear at the corresponding inputs 20, 24 and 25 of the generator 21 which would provoke at the output 23 a programming voltage $V_{pp}$ and at the output 22 a voltage $V_{cc}$ of incorrect values which would risk damaging the circuits of the card 10.

To prevent this type of operation, it is arranged that, during the reset procedures, the microcontroller 12 directly controls the inputs 24, 25 of the generator 21 in such a way that no voltage is delivered at the outputs 22 and 23. In other words, in normal operation the generator 21 is controlled by the microcontroller 15, but during resets the generator 21 is controlled directly by the microcontroller 12. This procedure is made possible by the fact that it is the microcontroller 12 which controls the resets of the microcontroller 15 and that, as mentioned above, the outputs from the microcontroller 12 are at a fixed potential during resets.

In the example an output 30 from the microcontroller 12 controls a port 31 whose outputs 32 and 33 are connected to the inputs 24 and 25. In normal operation the outputs 32 and 33 are floating, while during the reset periods these outputs are at a fixed potential, for example ground potential, so that the outputs 22 and 23 of the generator 21 deliver no voltage. In other words, during the resets the signals at the inputs 24 and 25 are stop signals.

When the reader 11 is switched on, the microcontroller 12 controls the reset of the microcontroller 15, and then under the control of the microcontroller 12 the microcontroller 15 determines the characteristics of the card 10. The values of the supply and programming voltages for the card 10 are delivered at the outputs 16, 17, 18, 26, 27 of the microcontroller 15 in order to control the generator 21 as indicated above. The microcontroller also determines the other characteristics of the card: clock frequency, current consumption, exchange speed, mode of operation (synchronous or a synchronous).

Then information is exchanged between the circuit of the card 10 and the microcontrollers 12 and 15 in order to determine whether the card contains an authorization to unscramble the broadcasts. If the response is positive the unscrambling is performed in a conventional manner which is not within the field of the invention and which is therefore not described here.

In the example the programming voltages can have four values: 5 volts, 12.5 volts, 15 volts and 21 volts, the clock frequency can have values of 3.5 MHz, 7 MHz and another value peculiar to the card, the current consumption is 80 mA, the exchange speed is 9600 bauds or 19 200 bauds and the mode of operation is generally a synchronous.

Of course at each reset the signals applied to the inputs 24 and 25 inhibit the outputs 22 and 23, thanks to the microcontroller 12.

As a variant, at each reset, under the control of the microcontroller 12, voltages of minimal values appear at the outputs 22 and 23 which do not risk causing damage to the circuits of the card 10.

What is claimed is:

1. A reader for a smart card wherein said smart card contains circuits and contacts for connection to said reader in order to exchange protocol between the reader and the card to determine whether the smart card has proper authorization for the reception of external signals fed to said reader, said reader comprising:
   a power supply means for powering the circuits of said card;
   a controller means including a first microcontroller for receiving said external signals and for outputting a control signal for controlling a second microcontroller wherein said second microcontroller includes a means for controlling an exchange of information between said second microcontroller and said card and wherein said second microcontroller further includes a means for delivering signals to controls aid power supply as a function of information received from said circuits of said card.

2. The reader according to claim 1 wherein said first microcontroller further comprises a first output voltage means which is at a fixed potential during a reset procedure when said reader is switched on and wherein said second microcontroller means further includes an output means at a floating potential during said reset procedure and wherein said first microcontroller includes a means for controlling said power supply during said reset procedure.

3. The reader according to claim 2 wherein said power supply includes outputs which are inhibited during said reset procedure.

4. The reader according to any one of claims 1-3 wherein said second microcontroller further includes output means for presenting the values of the output voltages from said power supply and said second microcontroller further includes at least one additional output means for delivering on-off signals to said power supply.

5. The reader according to any one of claims 2 and 3 wherein said power supply includes on-off inputs which are controlled by said first microcontroller during said reset procedure.

6. The reader according to claim 2 or 3 wherein said power supply has a first output for supplying voltages to said card and a second output for supplying voltages of said card.

* * * * *